United States Patent
Wong et al.

(10) Patent No.: US 7,223,433 B2
(45) Date of Patent: May 29, 2007

(54) FLOUR/STARCH BLEND FOR PREPARING STUFFED ROLLS WRAPPERS

(76) Inventors: Janet Wong, A1, 36/F Beverly Hill, 6 Broadwood Road, Hong Kong (HK); Maria Ho, 20A, Block 4, Sheung Shui Town Center, Sheung Shui, New Territories, Hong Kong (HK)

( * ) Notice: Subject to any disclaimer, the term of this patent is extended or adjusted under 35 U.S.C. 154(b) by 526 days.

(21) Appl. No.: 10/480,906

(22) PCT Filed: Jun. 13, 2001

(86) PCT No.: PCT/EP01/07447

§ 371 (c)(1),
(2), (4) Date: Dec. 15, 2003

(87) PCT Pub. No.: WO02/100178

PCT Pub. Date: Dec. 19, 2002

(65) Prior Publication Data

US 2004/0185160 A1    Sep. 23, 2004

(51) Int. Cl.
*A21D 10/00* (2006.01)
(52) U.S. Cl. ............... 426/549; 426/555; 426/560; 426/511
(58) Field of Classification Search ............ 426/622, 426/511, 555, 560, 549, 94
See application file for complete search history.

(56) References Cited

U.S. PATENT DOCUMENTS

| | | | |
|---|---|---|---|
| 4,873,093 A | 10/1989 | Fazzolare et al. | 426/28 |
| 5,340,598 A | 8/1994 | Hay, Jr. et al. | 426/496 |
| 5,514,404 A * | 5/1996 | Zimmerman et al. | 426/549 |
| 5,997,918 A | 12/1999 | Melvej | 426/102 |
| 6,001,409 A * | 12/1999 | Gimmler et al. | 426/549 |
| 6,039,997 A * | 3/2000 | Mizoguchi et al. | 426/549 |
| 6,139,894 A | 10/2000 | Hoshino et al. | 426/549 |
| 6,159,521 A | 12/2000 | Horn et al. | 426/549 |
| 6,194,010 B1 | 2/2001 | Bavone | 426/89 |
| 6,221,420 B1 | 4/2001 | Thomas et al. | 426/578 |
| 6,228,414 B1 * | 5/2001 | Villagran et al. | 426/549 |
| 6,432,465 B1 * | 8/2002 | Martines-Serna Villagran et al. | 426/549 |

FOREIGN PATENT DOCUMENTS

| JP | 2001-086924 | * | 3/2001 |
|---|---|---|---|
| WO | WO 00/28828 | | 5/2000 |

OTHER PUBLICATIONS

Roy L. Whistler, Elements of Food Technology, edited by Norman W. Desrosier, Avi Publishing Company, 1977.*
DATABASE WPI, Section Ch, Week 199321, Derwent Publications Ltd., London, GB; Class D13, AN 1993-168209. XP002191364.
Otto Weibel. "Chee Cheong Fun Filled Chicken On XO Sauce and Canopy With Crispy Ginger." *New Asia Cuisine Scene Magazine* (online). XP002191363.

* cited by examiner

*Primary Examiner*—Keith Hendricks
*Assistant Examiner*—Vera Stulii
(74) *Attorney, Agent, or Firm*—Morgan Lewis & Bockius LLP

(57) ABSTRACT

The invention relates to a flour/starch blend for preparing stuffed rolls wrappers, said blend comprising: from 48% to 52% of high amylose rice starch; from 31% to 36% of high amylose rice flour; from 8% to 12% of potato starch; from 4% to 7% of modified tapioca starch; from 0.2 to 2% of pregelatinized wheat flour. Stuffed rolls wrappers obtained from said blend can withstand freezing/thawing without loss of their qualities.

23 Claims, No Drawings

FLOUR/STARCH BLEND FOR PREPARING STUFFED ROLLS WRAPPERS

This invention relates to the making of frozen stuffed pastry rolls, especially cheong fun.

Cheong fun is a steam-cooked roll, traditionally prepared by rolling the filling ingredients (mainly meat, fish or shellfish), cut in thin slices and seasoned, in a wrapper of slurry made from rice flour, and steaming the stuffed roll thus obtained.

When frozen and reheated these products do not keep the satisfactory aspect, consistency and taste of the freshly prepared rolls. In particular, freezing and thawing induce a degradation of the texture of the wrapper.

The present invention aims at producing stuffed pastry rolls that can be kept frozen while retaining the qualities of the freshly prepared products.

The susceptibility of starch-based products to freezing is known in the art. Their instability is mainly the consequence of retrogradation. Retrogradation is a "crystallisation" of starch, resulting from interactions between the linear amylose molecules during freezing. This creates important structural alterations and induces syneresis when the product is thawed. To limit these problems, it is generally recommended to use flour or starch with a high amylopectin content, since the branched amylopectin structure is more resistant to retrogradation.

The applicants have now found that, unexpectedly, a good preservation of the qualities of the wrapper sheet is obtained when the wrapper is prepared from slurry comprising an important percentage of high amylose rice starch and high amylose rice flour.

Amylose is the linear fraction of starch: it consists of a chain of glucose units linked by a 1,4 linkage. Amylopectin is the branched fraction of starch: it is composed of glucose units linked by 1,4- and 1,6-alpha-glucosidic linkages; each branch is relatively short and contains about 20–30 glucose units.

Amylose content ranges from 0% to 2% of total starch in waxy rice, 5% to 12% in short grain rice, 12% to 20% in medium grain rice, 20% to 25% in long grain rice, with high amylose varieties having an amylose content from 25% to 33%. "High amylose rice flour" and "high amylose rice starch" are herein respectively defined as rice flour and rice starch wherein amylose represents at least 25% (by mass) of total carbohydrate.

The present invention provides a flour/starch blend for preparing stuffed rolls wrappers, wherein said blend comprises, in percent of the total weight of the blend:

a) from 48% to 52%, and preferably from 49% to 51%, of high amylose rice starch;

b) from 31% to 36%, and preferably from 32% to 35%, of high amylose rice flour;

c) from 8% to 12%, and preferably from 9% to 11%, of potato starch having an amylose content of from 21% to 23% by weight and an amylopectin content of from 73 to 79% by weight;

d) from 4% to 7%, and preferably from 5% to 6%, of modified tapioca starch;

e) from 0.2 to 2%, preferably from 0.5% to 1.5%, and more preferably from 0.8% to 1.2%, of pregelatinized wheat flour.

Preferably, the modified tapioca starch is converted starch obtained, for instance, by acid hydrolysis of tapioca starch.

The invention also provides a slurry for preparing rolls wrappers, roll wrappers and stuffed rolls obtained from the above flour/starch blend.

According to the invention, a slurry for preparing rolls wrappers can be obtained by adding water, and optionally seasoning, in particular salt, to the flour/starch blend described above, and stirring the resulting mixture.

Usually, the amount of water represents from about 60% to about 90%, preferably from about 70% to about 80% of the total weight of the slurry, so as to obtain a semi-liquid slurry. The amount of salt represents generally from about 0.1% to about 0.3% of the total weight of the slurry.

Stirring is performed in a conventional manner, for instance manually, or by slow mechanical stirring, e.g. at 60 strokes per minute.

To obtain wrappers of the invention, the slurry is spread on a cooking-plate or a cooking-pan. Steam cooking is generally preferred, in order to obtain a soft wrapper easy to roll up. Advantageously, to obtain stuffed rolls such as cheong fun, the filling is spread on the slurry sheet before steam-cooking. The slurry sheet with filling spread on it is usually cooked for 3 to 5 minutes, preferably for 3.5 to 4 minutes at 98–100° C.

Alternatively, the slurry can be cooked separately and the filling spread on the cooked wrapper.

Stuffed rolls of the invention are formed by rolling the filling up in the wrapper, manually or mechanically.

The filling may comprise any usual ingredients of stuffed rolls, such as meats, vegetables, fish or shellfish, as well as usual additives and seasonings.

Generally the formed stuffed roll is further steamed until the temperature at the centre of the roll reaches at least 80° C., preferably at least 86° C. This can be achieved for instance by steaming at 98–100° C. for 2 to 10 minutes, depending on the size of the roll.

The roll is cooled to be frozen directly. After cooking, the roll will go through freezing process preferably cool down to 45° C.–50° C. before entering the blast freezer. The freezing is performed as promptly as possible, according to the classical methods of quick freezing. It is preferably carried out at −10° C. to −20° C., preferably at −10° C. to −15° C.

The frozen rolls are then packaged, and stored at a temperature below −18° C. until thawing and eating by the consumer.

In contrast with the stuffed rolls of the prior art, which lose part of their qualities after freezing and thawing, the stuffed rolls of the invention have excellent aspect, texture, and taste not only immediately after preparation, but also after freezing and storage in a freezer and subsequent heating and thawing in a microwave oven.

The present invention will further be described by the example below. It is noted that this examples are given only for illustration and are not intended for limiting the invention.

EXAMPLE 1

Preparation of Frozen Beef Cheong Fun

1) Formula:

The formula is shown in table I below:

TABLE I

| Ingredient | % |
|---|---|
| Pastry | |
| Water | 40–50 |
| Rice Starch - ERAWAN | 7.5–8.5 |
| Rice Flour - ERAWAN | 5–6 |
| Potato Starch | 1–2 |
| Purity 1 | 0.5–1 |
| Sami 10 | 0.1–0.2 |

TABLE I-continued

| Ingredient | % |
|---|---|
| Salt | 0.1–0.2 |
| Filling Mixture | |
| Beef, 5 mm minced | 13–14 |
| Water chestnut, diced 2 times | 2–3 |
| Artificial Fat, minced 2 times | 1–1.3 |
| Celery, minced 2 times | 0.3–0.4 |
| Parsley, chopped | 0.3–0.4 |
| Scallion, diced | 0.3–0.4 |
| Water, for orange peel | 0.1–0.2 |
| Orange Peel, minced 2 times | 0.05–0.1 |
| Water for potato starch | 11–13 |
| Potato Starch | 1.5–2 |
| Sugar | 0.5–1 |
| Monosodium glutamate | 0.5–1 |
| Salt | 0.5–1 |
| Sunflower Seed Oil | 0.5–1 |
| Garlic Oil | 0.5–1 |
| Sesame Oil | 0.2–0.4 |
| Ginger, juice only | 0.2–0.4 |
| Rice Wine | 0.1–0.2 |
| White Pepper Powder | 0.05–0.1 |
| Sodium Bicarbonate | 0.05–0.1 |
| Potassium Carbonate Solution | 0.02–0.04 |
| Sunflower Seed Oil (topping) | 4–5 |

The properties of ERAWAN rice starch are summarized in table II below:

TABLE II

| Amylopectin (on total carbohydrate) | 74.00%. |
|---|---|
| Amylose (on total carbohydrate) | 26.00% |
| Carbohydrate (on dry weight) | 85% |

The properties of ERAWAN rice flour are summarized in table III below:

TABLE III

| Amylopectin (on total carbohydrate) | 70% |
|---|---|
| Amylose (on total carbohydrate) | 30% |
| Carbohydrate (on dry weight) | 79%–81% |

The properties of potato starch are summarized in table IV below:

TABLE IV

| Amylopectin (on total carbohydrate) | 78% |
|---|---|
| Amylose (on total carbohydrate) | 22% |

PURITY 1 (commercialised by NATIONAL STARCH) is a modified starch, obtained from tapioca starch by mild acid hydrolysis.

SAMI 10 (commercialised by BRAUN) consists essentially of weight of pregelatinized wheat flour.

2) Process:

Slurry:

The ingredients are mixed at 60 strokes/min. until an homogeneous slurry is obtained.

Filling:

Mix at high speed for 10 min the following ingredients: salt, minced beef, sodium bicarbonate, potassium carbonate, minced orange peel;

Add the sugar, monosodium glutamate, white pepper, rice wine and ginger juice; mix at low speed;

Add the potato starch suspension; mix at high speed for 5 min;

Add the diced water chestnut, minced celery, chopped parsley, diced scallion; mix at low speed;

Add the minced artificial fat, sunflower seed oil, garlic oil and sesame oil; mix at low speed.

Forming the Cheong Fun

A scoop of 170–175 gm of slurry is spread over a pan top of a steamer.

The filling is spread on top of the slurry.

The slurry and filling are covered and steamed for 3.5 to 4 minutes at 98° C.–100° C.

The soft pastry and filling are manually rolled into tubular shaped cheong fun.

The formed cheong fun is steamed for about 3.5 minutes, until the temperature at the centre reaches at least 86° C.

The product is then quickly frozen at −10° C. before packaging and sealing.

The final product is stored at a temperature below −18° C.

EXAMPLE 2

Preparation of Shrimp Cheong Fun

1) Formula:

The formula is shown in table VII below:

TABLE VII

| Ingredient | % |
|---|---|
| Pastry | |
| Water | 40–50 |
| Rice Starch - Erawan | 8–9 |
| Rice Flour - Erawan | 5–6 |
| Potato Starch | 1.5–2 |
| Purity 1 | 0.5–1.5 |
| Sami 10 | 0.1–0.2 |
| Salt | 0.1–0.2 |
| Filling Mixture | |
| Shrimp 60/80, China, deveined | 19–20 |
| Water | 3.5–4.5 |
| Potato Starch to treat shrimp | 1.5–2.5 |
| Potassium Carbonate Solution | 0.15–0.2 |
| Potato Starch | 3–4 |
| Monosodium glutamate | 0.6–0.7 |
| Parsley, chopped | 0.6–0.7 |
| Salt | 0.5–0.6 |
| Sugar | 0.3–0.4 |
| Sesame Oil | 0.2–0.3 |
| White Pepper | 0.1–0.15 |
| Sunflower Seed Oil (for coating) | 4.5–4.7 |

2) Process:

Slurry:

The ingredients are mixed as described in example 1 above.

Filling:

Marinate the shrimps for 10 minutes in water, potato starch (to treat the shrimps) and potassium carbonate solution;

Rinse with tap water for 20 minutes and drain;

Add the dry and wet seasonings, and the parsley; mix at low speed;

add the potato starch; mix at low speed;

The cheong fun is formed, frozen, and packaged as described in example 1 above.

EXAMPLE 3

Preparation of Char Siu Cheong Fun

1) Formula:
The formula is shown in table VIII below:

TABLE VIII

| Ingredient | % |
| --- | --- |
| Pastry | |
| Water | 50–60 |
| Rice Starch - Erawan | 10–11 |
| Rice Flour - Erawan | 6–7 |
| Potato Starch | 2–2.5 |
| Purity 1 | 1–1.5 |
| Sami 10 | 0.15–0.25 |
| Salt | 0.1–0.2 |
| Filling Mixture | |
| Pork, 20 cm × 7.5 cm × 3.5 cm | 12–13 |
| Char Siu Sauce, #840 | 2–3 |
| Sugar | 1–1.5 |
| Sunflower Seed Oil | 0.5–1 |
| Rice Wine | 0.4–0.6 |
| Monosodium glutamate | 0.2–0.3 |
| Salt | 0.2–0.3 |
| Amoy Caramel | 0.15–0.2 |
| Hexacol Orange Yellow 3483 | 0.003–0.0004 |
| Sunflower Seed Oil (topping) | 5–6 |
| Potato Starch (coating) | 0.8–1.0 |

2) Process:

Slurry:
The ingredients are mixed as described in example 1 above.

Filling:
Mix the following ingredients: pork, char siu sauce, rice wine and caramel;
Add the sugar, monosodium glutamate, salt, 20 Orange Yellow 3483;
Marinate for 1 hour;
Coat oil on marinated pork surface;
Bake at 190° C. for 25 minutes;
Cool down, cut into 1.5×1.5×0.2 cm pieces;
Add juice back to the filling to give 70% yield;
Chill at 4° C. overnight;
Add the potato starch.
The cheong fun is formed, frozen, and packaged as described in example 1 above.

The invention claimed is:

1. A blend of flour and starch comprising by percentage total weight of the blend:
   a) from 48 to 52% high amylose rice starch;
   b) from 31 to 36% high amylose rice flour;
   c) from 8 to 12% potato starch having an amylose content from 21 to 23% by weight of the starch and an amylopectin content of from 73 to 79% by weight of the starch;
   d) from 4 to 7% modified tapioca starch;
   e) from 0.2 to 2% pregelatinized wheat flour.

2. The blend of claim 1 wherein the high amylose rice starch is present in an amount between 49 and 51% by weight of the total weight of the blend.

3. The blend of claim 1 wherein the high amylose rice flour is present in an amount between 32 and 35% by weight of the total weight of the blend.

4. The blend of claim 1 wherein the potato starch is present in an amount between 9 and 11% by weight of the total weight of the blend.

5. The blend of claim 1 wherein the modified tapioca starch is present in an amount between 5 and 6% by weight of the total weight of the blend.

6. The blend of claim 1 wherein the pregelatinized wheat flour is present in an amount between 0.5 and 1.5% by weight of the total weight of the blend.

7. The blend of claim 1 wherein the pregelatinized wheat flour is present in an amount between 0.8 and 1.2% by weight of the total weight of the blend.

8. A slurry comprising the flour/starch blend of claim 1 in combination with an amount of water sufficient to form a slurry.

9. The slurry of claim 8 further comprising seasonings.

10. The slurry of claim 9 wherein the seasoning is salt.

11. The slurry of claim 9 wherein the water is present in an amount between 60 and 90% of the total weight of the slurry and the salt is present in an amount between 0.1 and 0.3% of the total weight of the slurry.

12. The slurry of claim 10 wherein the water is present in an amount between 70 and 80% of the total weight of the slurry.

13. A method of making a wrapper for a stuffed roll comprising forming the slurry of claim 8 into a sheet and cooking the slurry.

14. A wrapper for a stuffed roll produced by the method of claim 13.

15. A stuffed roll comprising the wrapper of claim 14 in combination with a filling.

16. A method of making a stuffed roll comprising
   a) forming a slurry sheet by spreading the slurry of claim 8 on a cooking plate or a cooking pan;
   b) spreading a filling on said slurry sheet;
   c) steam-cooking the slurry sheet with the filling;
   d) forming a stuffed roll by rolling the filling up in the cooked slurry sheet.

17. The method of claim 16 further comprising steam-cooking the formed stuffed roll as step e).

18. The method of claim 16 further comprising freezing the stuffed roll.

19. The method of claim 17 further comprising freezing the stuffed roll.

20. A stuffed roll produced by the method of claim 16.
21. A stuffed roll produced by the method of claim 17.
22. A stuffed roll produced by the method of claim 18.
23. A stuffed roll produced by the method of claim 19.

* * * * *